United States Patent [19]

Shekleton et al.

[11] Patent Number: 5,062,262
[45] Date of Patent: Nov. 5, 1991

[54] COOLING OF TURBINE NOZZLES

[75] Inventors: Jack R. Shekleton, San Diego, Calif.; Douglas C. Johnson, Rockford, Ill.

[73] Assignee: Sundstrand Corporation, Rockford, Ill.

[21] Appl. No.: 291,056

[22] Filed: Dec. 28, 1988

[51] Int. Cl.⁵ .............................................. F02C 3/05
[52] U.S. Cl. ................................... 60/39.36; 60/760; 415/115
[58] Field of Search ...................... 60/39.36, 737, 738, 60/743, 752, 760, 39.83, 755; 415/115; 416/97 R; 417/406, 407

[56] References Cited

U.S. PATENT DOCUMENTS

| 2,166,823 | 7/1939 | Rosenlocher | 415/115 |
| 3,383,855 | 5/1968 | Freeman et al. | 60/760 |
| 3,572,960 | 3/1971 | McBride | 415/115 |
| 3,799,696 | 3/1974 | Redman | 416/97 R |
| 3,937,013 | 2/1976 | Aspinwall | 60/39.36 |
| 4,798,515 | 1/1989 | Hsia et al. | 415/115 |
| 4,812,522 | 4/1989 | Matthews et al. | 60/39.83 |

FOREIGN PATENT DOCUMENTS 876540  7/1971  Canada ................. 415/115

*Primary Examiner*—Louis J. Casaregola
*Assistant Examiner*—Timothy S. Thorpe
*Attorney, Agent, or Firm*—Wood, Phillips, Mason, Recktenwald & Vansanten

[57] ABSTRACT

Inexpensive cooling of a gas turbine nozzle and shroud assembly 62, 66, 76 is obtained by locating passages 84, 88, 102 in the vanes 76 forming part of the nozzle structure 62, 66, 76 so as to open generally centrally of the vanes 76 in the area between the shrouds 62 and 66 and in the leading edge of the vanes 76.

10 Claims, 2 Drawing Sheets

COOLING OF TURBINE NOZZLES

FIELD OF THE INVENTION

This invention relates to gas turbines that operate on gases of combustion, and more specifically, to the cooling of the nozzle used in such turbines for directing the gases of combustion against a turbine wheel.

BACKGROUND OF THE INVENTION

One substantial impediment to achieving high thermal efficiency in gas turbines resides in the inability of certain components, most notably the turbine wheel, turbine wheel vanes and turbine nozzle, to operate reliably and with long life at the high temperatures required to obtain high degrees of thermal efficiency. One means of overcoming the difficulty is to employ relatively exotic materials in the manufacture of these components, that is, use materials that are capable of withstanding the high temperatures as well as the thermal cycling associated with operation of the turbine. This solution, however, is an expensive one and is accordingly is not susceptible to use on a wide scale.

As an alternative, the art has preferred to seek improved schemes for cooling the components so that the same may be exposed to gases at ever increasing temperatures but without being heated to those temperatures themselves. Not infrequently, various means of distributing compressed air from the compressor of the engine to the components requiring cooling by means of various passages have been employed. All too frequently, however, the passages may be tortuous or large in number in relation to the vanes employed and otherwise unduly complicated. Such passages may be very small, particularly in small turbines and hence prone to plug up. In addition such small passages are costly to make.

The present invention is directed to the provision of simple, but highly effective cooling means for turbine nozzles in the form of low cost, large coolant carrying passageways.

SUMMARY OF THE INVENTION

It is the principal object of the invention to provide a new and improved gas turbine. More specifically, it is an object of the invention to provide a gas turbine with improved turbine nozzle cooling which is effective, but simple in construction and therefore economical to form and includes low cost passageways which are not prone to plugging.

An exemplary embodiment of the invention achieves the foregoing object in a gas turbine including a rotary compressor and a radially inflow turbine wheel mounted for rotation and coupled to the compressor. An annular nozzle and shroud structure surrounds the turbine wheel and includes an annular, generally radially extending front shroud on one side of the turbine wheel, an annular radially and axially extending rear shroud on the opposite side of the turbine wheel and a plurality of vanes interposed between and supported by the shrouds radially outwardly of the turbine wheel. The vanes have leading edges remote from the turbine wheel and downstream edges oppositely thereof.

A combustor is provided for receiving compressed air from the compressor and fuel from a source, combusting the same and providing hot gases of combustion to the nozzle at the leading edges of the vanes. At least one passage is located in each such vane. Each passage opens to the associated leading edge generally centrally thereof. Means are associated with the compressor for providing compressed air to the passages.

By means of this structure, opposite ends of the vane are cooled by conduction to the front and rear shrouds while the centers of the vanes, which are more remote from the shrouds and thus less easily cooled by conduction, are cooled by the flow of compressed air to the central area of the vanes through the passages.

In a preferred embodiment of the invention, the means for providing compressed air includes openings in the front shroud which are in fluid communication with corresponding ones of the passages. In a highly preferred embodiment, there is an annular diffuser disposed about the compressor and upstream of the combustor. The diffuser includes a generally radial wall adjacent, but spaced from, the front shroud to thereby define a plenum in fluid communication with the openings in the front shroud. An entrance to the plenum is provided and is in fluid communication with the compressor downstream of the diffuser and generally upstream of the combustor.

According to one embodiment of the invention, the passages comprise grooves in the leading edge of the associated vanes and extend from the front shroud to at least about the mid point of the associated vane.

According to another embodiment of the invention, the passages include first, generally axial sections wholly within the associated vane, and second, somewhat radial sections defining outlets generally centrally of the leading edge and extending interiorly of the associated vane to intersect the corresponding first section.

A highly preferred embodiment includes means defining a series of apertures, at least one for each vane, radially outwardly of the associated vane and in fluid communication with the compressor downstream of the diffuser for introducing streams of compressed air into the gases of combustion such that the streams impinge upon a corresponding one of the vanes to provide adding cooling.

In one embodiment of the invention, the apertures are in the front shroud while in another embodiment of the invention, the apertures are located in an outer wall of the combustor.

Other objects and advantages will become apparent from the following specification taken in connection with the accompanying drawings.

DESCRIPTION OF THE PREFERRED EMBODIMENT

Figures 1, 2:
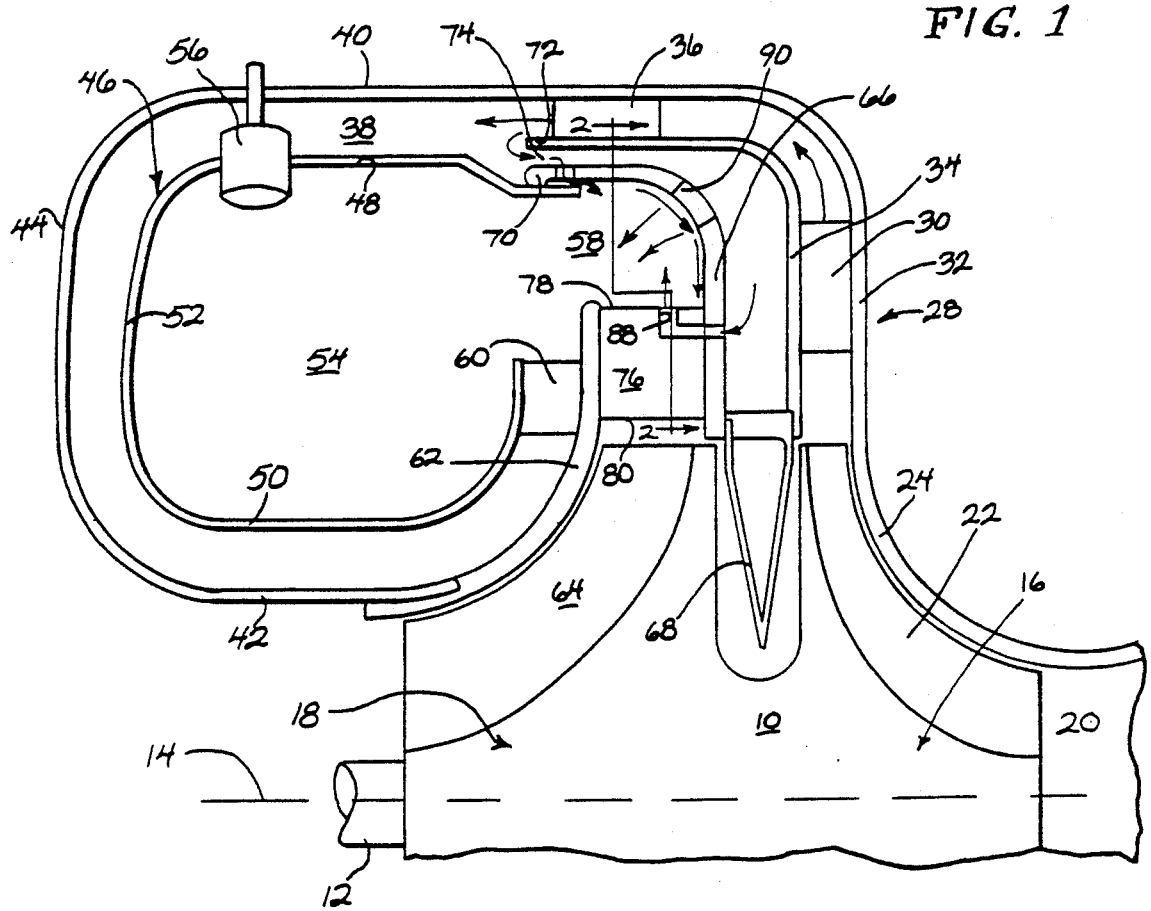
FIG. 1 is a fragmentary, sectional view of a gas turbine made according to the invention.
FIG. 2 is an enlarged, fragmentary sectional view taken approximately along the line 2—2 in FIG. 1.

An exemplary embodiment of a gas turbine made according to the invention is illustrated in the drawings and with reference to FIG. 1 is seen to include a rotor, generally designated 10 associated with a rotary shaft 12 by which the rotor 10 may be mounted for rotation about an axis 14. The rotor 10 includes a compressor side 16 and a turbine wheel side 18. However, those skilled in the art will recognize that the compressor 16 and turbine wheel 18 may be totally separate entities if desired, although they will be mechanically coupled so that rotation of the turbine wheel 18 will ultimately drive the compressor 16.

The gas turbine includes an air inlet 20 adjacent to the compressor 16 and the latter includes blades 22 along with a compressor shroud 24 which is stationary. Compressed air exits the blades 22 in a generally radial direction to enter a conventional diffuser, generally designated 28. As is well known, the diffuser 28 will typically includes stationary diffuser vanes 30 disposed between two generally radially extending walls 32 and 34.

The walls 32 and 34 take a bend and extend to a deswirler 36. The deswirler 36, if used, discharges into a compressed air plenum 38 that is annular about the axis 14. The plenum 38 includes a a radially outer wall 40, a radially inner wall 42 and a radially extending wall 44 interconnecting the walls 40 and 42.

Within the plenum 38 is an annular combustor, generally designated 46. It includes a radially outer wall 48, a radially inner wall 50 and a radial wall 52 interconnecting the walls 48 and 50. Means are provided whereby compressed air from the plenum 38 may enter a combustion space 54 defined by the walls 48, 50 and 52 to be combusted with fuel injected therein by means of one or more injectors 56. The resulting gases of combustion leave the combustion space 54 via a combustor outlet 58.

The plenum 38 extends entirely about the combustor 46 and includes an outlet area 60 in the vicinity of the combustor outlet 58. Consequently, much compressed air does not enter the combustion space 54 for the purpose of supporting combustion, but passes about combustor 46 to enter as dilution air via the plenum outlet 60. In the course of flowing to the outlet 60, the compressed air comes in heat exchange relation with a rear shroud 62 for the vanes 64 on the turbine wheel 18. The rear shroud 62 is made of metal and requires cooling by reason of its exposure to the hot gases of combustion that are directed against the vanes 64 on the turbine wheel 18. As can be seen, the rear shroud 62 extends both radially and axially as the vanes 64 are disposed on the turbine wheel 18 so as to define a radial inflow turbine wheel.

Spaced from the wall 34 in the direction of the combustor 46 is an annular, metal, front shroud 66 which mounts a seal plate structure 68 for isolating the compressor 16 from the turbine 18. The front shroud 66 extends generally radially and then axially to join with the wall 48 of the combustor 46. It will be noted that the axial extension 70 of the front shroud 66 is located radially inward of the axial extension 72 of the wall 34 so as to define a peripheral, annular inlet 74 to a cooling air plenum 75 defined by the wall 34 and the front shroud 66.

Extending between the rear shroud 62 and the front shroud 66 at a location just radially outward of the turbine wheel 16 are a plurality of vanes 76. The vanes 76 together with the shroud 62 and 66 define a nozzle and shroud structure whereby hot gases of combustion from the combustor 46 exit the outlet 58 thereof to impinge upon the leading edges 78 of the vanes 76. That is to say, the leading edges 78 are remote from the turbine wheel 64 whereas downstream or trailing edges 80 of the vanes 76 are adjacent the turbine wheel 18.

In the embodiment illustrated in FIGS. 1 and 2, each vane 76 is provided with an axial passage 84 that extends inwardly and interiorly to approximately the mid point of the corresponding vane 76, the extension being from the front shroud 66. The front shroud 66 is provided with openings 86 which extend to the plenum 75 and which align with the passages 84.

Each vane 76 also includes a bore 88 generally centrally of its length that has a radial component and which opens to the leading edge 78 of the corresponding vane.

Consequently, compressed air from the compressor ultimately is directed through the passages 84, 88 in each vane 76 to emerge generally centrally thereof to cool that part of each vane 76 that is farthest from the shrouds 62, 66 and therefore less able to be cooled by conduction.

As an alternative or as a supplement, the front shroud 66, at locations radially outward of the leading edges 78, may be provided with a series of apertures 90 which also extend to the plenum 75. There will be at least one of the apertures 90 for each of the vanes 76 and as best seen in FIG. 2, the apertures 90 are so disposed with respect to their associated vanes that streams of air 92 emerging from one of the apertures 90 will impinge upon the leading edge 78 of the associated vane 76 generally centrally thereof to provide additional cooling.

Figure 3:
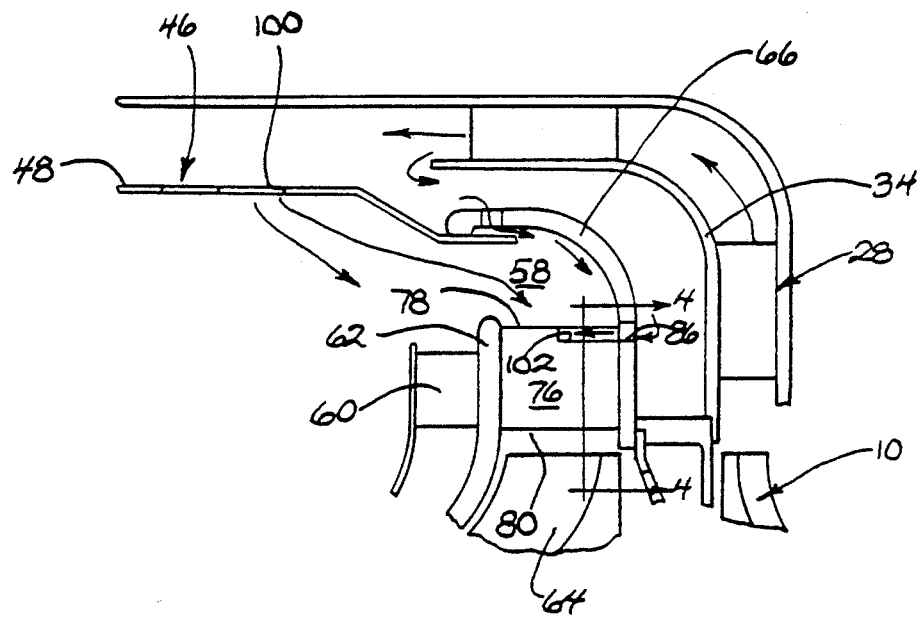
FIG. 3 is a fragmentary view of a modified embodiment of the invention.

A modified embodiment of the invention is illustrated in FIG. 3 and in the interest of brevity, those components that the embodiment of FIG. 3 shares with the embodiment of FIGS. 1 and 2 will not be redescribed and reference to the same will be by the same reference numerals where applicable.

In this embodiment, the apertures 90 in the front shroud 66 are dispensed with in favor of a series of apertures 100 (only one of which is shown) located in the radially outer wall 48 of the combustor 46 in the general vicinity of the outlet 58 from the combustor. There will be at least one of the apertures 100 for each of the vanes 76 and the orientation will be the same as in the embodiment previously described, namely, such that the stream of air flowing through each aperture 100 will impinge upon the leading edge 78 of a corresponding vane 76 generally centrally thereof.

Figure 4:
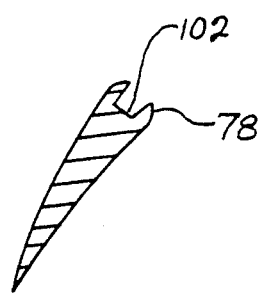
FIG. 4 is a sectional view taken approximately along the line 4—4 in FIG. 3.

In addition, the front shroud 66 optionally retains the apertures 86 as an alternative or as a supplement but the same are somewhat enlarged and are relocated to be aligned with the leading edge 78 of the corresponding vane 76. In this embodiment, rather than utilize the self-contained passage 84, the leading edge 78 of the vane is provided with an upstream facing groove 102 as seen in FIG. 4. Each groove 102 extends at least to the mid point of its associated vane 76 and is aligned with a corresponding one of the openings 86 in the front shroud 66. As a consequence, the air from the compressor 16 will pass through the openings 86 and flow through the grooves 102 until expelled therefrom upon reaching the ends thereof near the center of the corresponding vane 76. In the process, cooling of the vane will result.

From the foregoing, it will be appreciated that a gas turbine according to the invention includes improved nozzle cooling of simple construction. As a consequence, improved operating efficiency can be obtained at minimal expense in a construction that utilizes relatively large cooling air passages that are not prone to plugging as may be the case with conventional art.

We claim:

1. A gas turbine comprising:

a rotary compressor;

a radial inflow turbine wheel mounted for rotation and coupled to said compressor;

an annular nozzle and shroud structure surrounding said turbine wheel and including an annular, generally radially extending front shroud on one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said turbine wheel and downstream edges oppositely thereof;

a combustor for receiving compressed air from said compressor and fuel from a source, combusting the same and providing hot gases of combustion to said nozzle and shroud structure at the leading edges of said vanes;

at least one passage in each said vane; and means associated with said compressed air for providing compressed air to said passages;

said passages having means for defining an opening in the associated leading edge generally centrally of said vane sized to provide resistance to plugging by contaminants present in said compressed air.

2. The gas turbine of claim 1 wherein said providing means includes openings in said front shroud in fluid communication with corresponding ones of said passages.

3. The gas turbine of claim 2 further including an annular diffuser disposed about said compressor and upstream of said combustor, and including a generally radial wall adjacent, but spaced from, said front shroud to thereby define a plenum in fluid communication with said openings; and an entrance to said plenum in fluid communication with said compressor downstream of said diffuser and generally upstream of said combustor.

4. The gas turbine of claim 3 wherein at last some of said passages includes first, generally axial, sections wholly within the associated vanes and second somewhat radial, sections defining outlets generally centrally of the corresponding leading edges and extending interiorly of the associated vanes to intersect the corresponding first sections.

5. The gas turbine of claim 3 further including means defining a series of apertures, at least one for each vane, radially outwardly of the associated vane and in fluid communication with said compressor downstream of said diffuser for introducing streams of compressed air into the gases of combustion such that the streams impinge upon corresponding ones of said vanes.

6. The gas turbine of claim 5 wherein said apertures are in said front shroud.

7. The gas turbine of claim 5 wherein said combustor has a radially outer wall and said apertures are in said radially outer wall.

8. A gas turbine comprising:

a rotary compressor;

a radial inflow turbine wheel mounted for rotation and coupled to said compressor;

an annular nozzle and shroud structure surrounding said turbine wheel and including an annular, generally radially extending front shroud on one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said wheel and downstream edges oppositely thereof;

a combustor for receiving compressed air from said compressor and fuel from a source, combusting the same and providing hot gases of combustion to said nozzle and shroud structure at the leading edges of said vanes;

a groove in the leading edge of each said vane, each groove extending at least to the center of the associated leading edge from the front shroud; and means in said front shroud and associated with said compressor for providing compressed air to said passages.

9. A gas turbine comprising:

a rotary compressor;

a radial inflow turbine wheel mounted for rotation and coupled to said compressor;

an annular nozzle and shroud structure surrounding said turbine wheel and including an annular, generally radially extending front shroud on one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said turbine wheel and downstream edges oppositely thereof;

a combustor for receiving compressed air from said compressor and fuel from a source, combusting the same and providing hot gases of combustion to said nozzle and shroud structure at the leading edges of said vanes;

an axial passage interiorly of each said vane; and means in said front shroud and associated with said compressor for providing compressed air to said passages;

said passages having means for defining a single opening in the associated leading edge generally centrally of said vane sized to provide resistance to plugging by contaminants present in said compressed air.

10. A gas turbine comprising:

a rotary compressor;

a radial inflow turbine wheel mount for rotation and coupled to said compressor;

an annular nozzle and shroud structure surrounding said turbine wheel and including an annular, generally radially extending front shroud on one side of said turbine wheel, an annular, radially and axially extending rear shroud on the opposite side of said turbine wheel and a plurality of vanes interposed between and supported by said shrouds radially outwardly of said turbine wheel, said vanes having leading edges remote from said turbine wheel and downstream edges oppositely thereof;

a combustor for receiving compressed air from said compressor and fuel from a source, combusting the same and providing hot gases of combustion to said nozzle and shroud structure at the leading edges of said vanes;

at least one passage in each said vane, each opening to the associated leading edge generally centrally thereof;

means associated with said compressor for providing compressed air to said passages, said providing means including openings in said front shroud in fluid communication with corresponding ones of said passages;

an annular diffuser disposed about said compressor and upstream of said combustor, and including a generally radial wall adjacent, but spaced from, said front shroud to thereby define a plenum in fluid communication with said openings; and an entrance to said plenum in fluid communication with said compressor downstream of said diffuser and generally upstream of said combuster, wherein at least some of said passages comprise grooves in the leading edges of the associated vanes and extend from said front shroud to at least about the midpoint of the associated vane.

* * * * *